(12) United States Patent  
Ito

(10) Patent No.: US 10,948,762 B2  
(45) Date of Patent: Mar. 16, 2021

(54) LIQUID CRYSTAL APPARATUS AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/663,476

(22) Filed: Oct. 25, 2019

(65) Prior Publication Data

US 2020/0133057 A1 Apr. 30, 2020

(30) Foreign Application Priority Data

Oct. 26, 2018 (JP) .............................. JP2018-201566

(51) Int. Cl.  
*G02F 1/1335* (2006.01)  
*G02F 1/1368* (2006.01)

(52) U.S. Cl.  
CPC ...... *G02F 1/133526* (2013.01); *G02F 1/1368* (2013.01)

(58) Field of Classification Search  
CPC .................... G02F 1/133526; G02F 1/1368

USPC ............................................................. 349/95  
See application file for complete search history.

(56) References Cited

U.S. PATENT DOCUMENTS

2015/0205013 A1* 7/2015 Akasaka ............. G02B 3/0056  
359/619  
2015/0331280 A1* 11/2015 Wakabayashi ........ G02F 1/1339  
349/57

FOREIGN PATENT DOCUMENTS

| JP | 2004-325546 A | 11/2004 |
|---|---|---|
| JP | 2008-281669 A | 11/2008 |
| JP | 2015-049468 A | 3/2015 |
| JP | 2015-219255 A | 12/2015 |
| JP | 2016-075797 A | 5/2016 |
| JP | 2017-122786 A | 7/2017 |

* cited by examiner

*Primary Examiner* — Charles S Chang  
(74) *Attorney, Agent, or Firm* — Oliff PLC

(57) ABSTRACT

A liquid crystal apparatus includes a liquid crystal layer sandwiched between a counter substrate and an element substrate in which a plurality of pixels are disposed, and light is incident on the liquid crystal layer from the counter substrate. The counter substrate includes a first microlens disposed for each pixel. The element substrate includes a switching element disposed for each pixel and a second microlens disposed for each pixel. The second microlens includes a flat portion at the center of the lens.

13 Claims, 6 Drawing Sheets

LIQUID CRYSTAL APPARATUS AND ELECTRONIC APPARATUS

The present application is based on, and claims priority from JP Application Serial Number 2018-201566, filed Oct. 26, 2018, the disclosure of which is hereby incorporated by reference herein in its entirety.

BACKGROUND

1. Technical Field

The present disclosure relates to a liquid crystal apparatus and an electronic apparatus.

2. Related Art

A transmissive liquid crystal apparatus applied to a light valve of a projector is known as a liquid crystal apparatus. In such a liquid crystal apparatus, to enable bright display by effectively using light emitted from a light source, for example, a configuration is proposed in which a microlens is provided on an incident side of light with respect to a pixel, or on an incident side and an emission side of light of the pixel.

For example, JP-A-2015-219255 discloses a liquid crystal apparatus configured to include two microlenses on a counter substrate side and one microlens on an element substrate side to correspond to pixels. According to the liquid crystal apparatus having such a configuration, it is possible to make light transmitted through the liquid crystal apparatus to be substantially parallel light, and it is possible to suppress vignetting of a projection lens in a projector.

However, there is a problem that light may be excessively bent by the microlens on the element substrate side, may not enter the projection lens, and unnecessary light may be bent, and thus the light utilization efficiency and the contrast ratio may be reduced.

SUMMARY

A liquid crystal apparatus according to the present disclosure includes a first substrate, a second substrate disposed to face the first substrate via a liquid crystal layer, and a display region in which a pixel is disposed, light being incident on the liquid crystal layer from the first substrate. The first substrate includes a first microlens disposed to correspond to the pixel. The second substrate includes a switching element and a second microlens that are disposed to correspond to the pixel. The second microlens includes a flat portion at the center.

In the liquid crystal apparatus described above, a maximum length of the flat portion in plan view may be greater than or equal to 1 µm.

In the liquid crystal apparatus described above, a maximum length of the flat portion in plan view may be less than or equal to 70% of a length of a diagonal line of the pixel.

In the liquid crystal apparatus described above, the first substrate may include a third microlens disposed to correspond to the first microlens.

An electronic apparatus according to the present disclosure includes the liquid crystal apparatus described above.

DESCRIPTION OF EXEMPLARY EMBODIMENTS

With reference to the drawings, description is given below of exemplary embodiments of the disclosure. The accompanying drawings to be used are appropriately scaled up or down or otherwise exaggerated to allow parts to be described in a fully recognizable manner. Other components than components needed to be described may sometimes be omitted.

Note that, in the following exemplary embodiment, for example, when described as being "on a substrate", it is assumed that an object is disposed so as to be in contact with the substrate, an object is disposed on the substrate via other component, a part of an object is disposed so as to be in contact with the substrate, or a part of an object is disposed via other component.

The present exemplary embodiment will be described by taking, as an example, an active matrix liquid crystal apparatus including a Thin Film Transistor (TFT) as a switching element of a pixel. This liquid crystal apparatus can be used suitably as, for example, a liquid crystal light valve of a projector described below.

Figure 1:
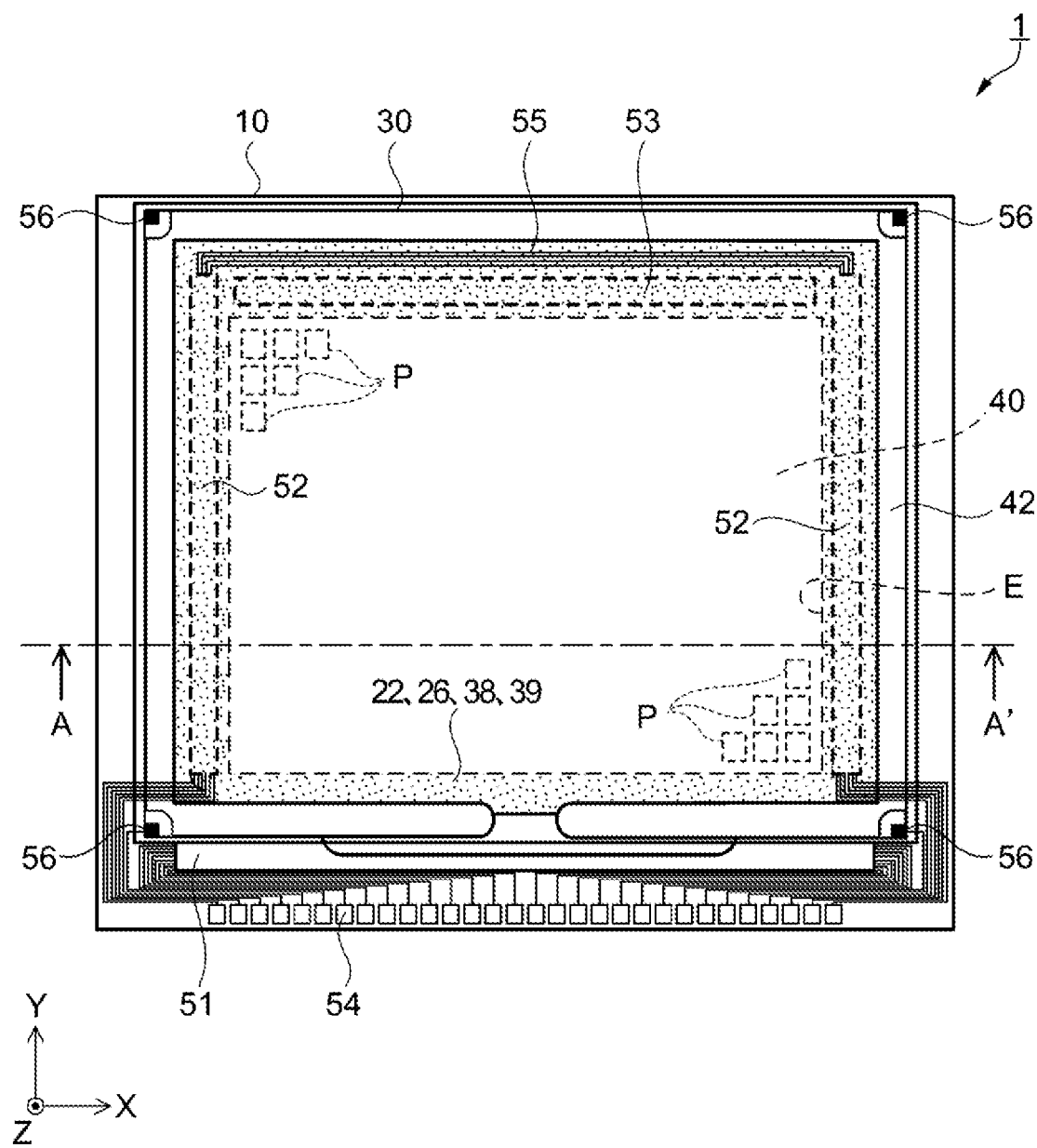
FIG. 1 is a schematic plan view illustrating a configuration of a liquid crystal apparatus.
Figure 2:
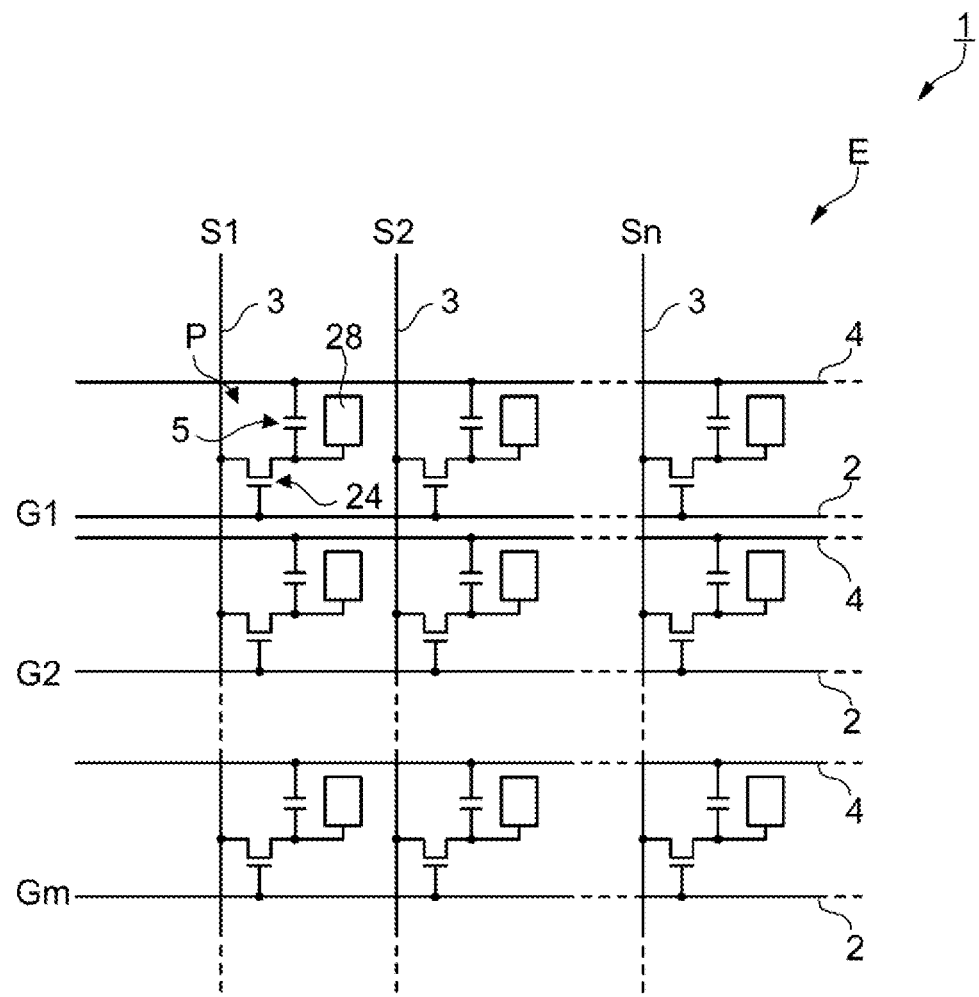
FIG. 2 is an equivalent circuit diagram illustrating an electrical configuration of the liquid crystal apparatus.
Figure 3:
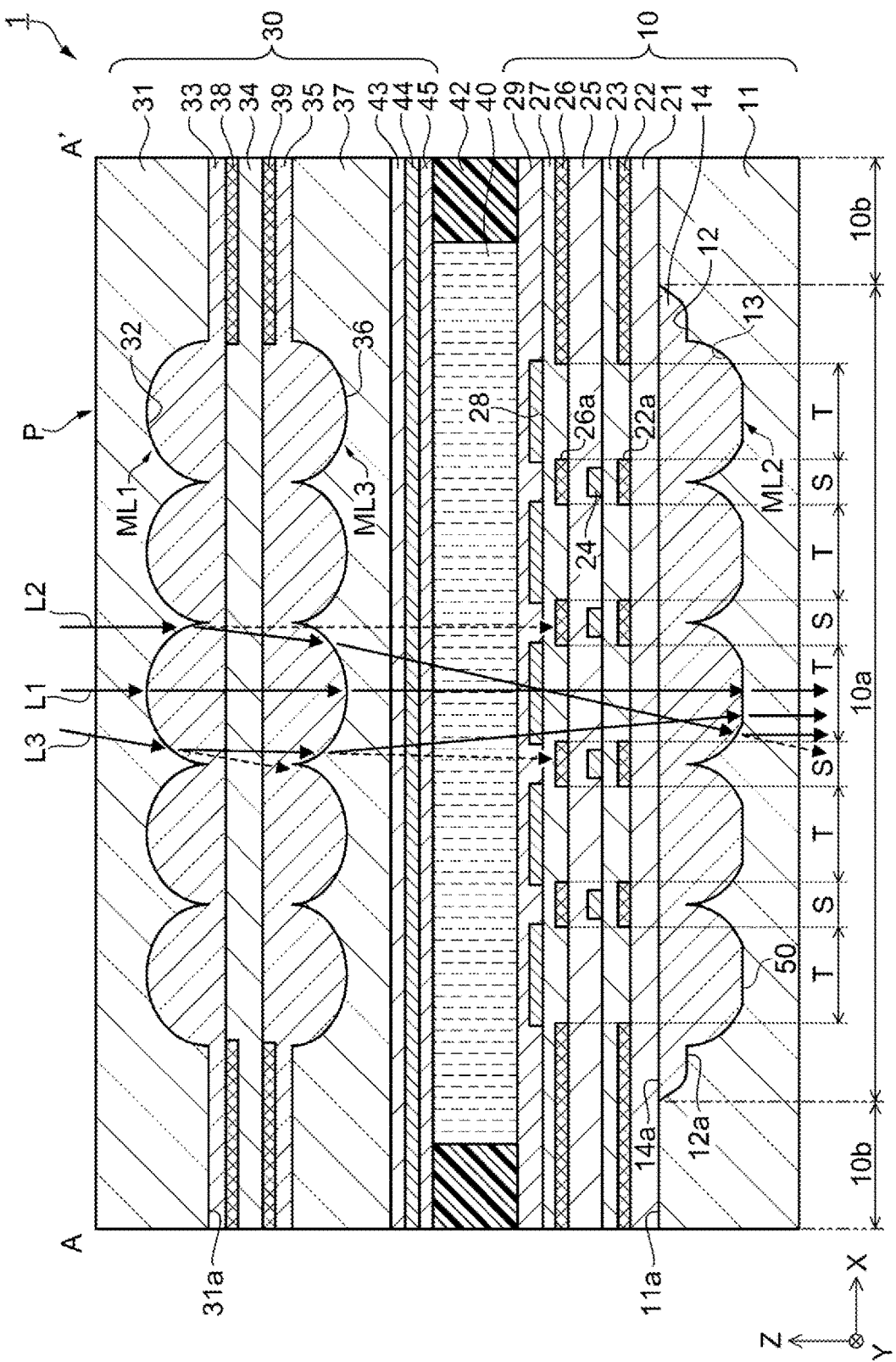
FIG. 3 is a schematic cross-sectional view along the line A-A' of the liquid crystal apparatus illustrated in FIG. 1.

Next, a liquid crystal apparatus according to the present exemplary embodiment will be described with reference to FIGS. 1 to 3. FIG. 1 is a schematic plan view illustrating a configuration of the liquid crystal apparatus. FIG. 2 is an equivalent circuit diagram illustrating an electrical configuration of the liquid crystal apparatus. FIG. 3 is a schematic cross-sectional view taken along line A-A' of the liquid crystal apparatus illustrated in FIG. 1.

First, as illustrated in FIG. 1, a liquid crystal apparatus 1 according to the present exemplary embodiment includes an element substrate 10 as a second substrate, a counter substrate 30 as a first substrate disposed so as to face the element substrate 10, a seal material 42, and a liquid crystal layer 40. The element substrate 10 has a size larger than that of the counter substrate 30, and both substrates are bonded together via the seal material 42 disposed in a frame shape along an edge portion of the counter substrate 30.

The liquid crystal layer 40 is constituted of a liquid crystal having positive or negative dielectric anisotropy encapsulated in a space surrounded by the element substrate 10, the counter substrate 30, and the seal material 42. The seal material 42 is formed of, for example, an adhesive such as a thermosetting or ultraviolet curable epoxy resin. A spacer (not illustrated) for maintaining an interval between the element substrate 10 and the counter substrate 30 constant is mixed into the seal material 42.

Light shielding layers 22 and 26 (see FIG. 3) provided in the element substrate 10 and light shielding layers 38 and 39 provided in the counter substrate 30 are disposed inside the seal material 42 disposed in the frame shape. The light shielding layers 22, 26, 38, and 39 have a frame-shaped peripheral edge portion, and are made of, for example, a light shielding metal or a metal oxide. The inside of the frame-shaped light shielding layers 22, 26, 38, and 39 is a display region E in which a plurality of pixels P are arranged. For example, the pixels P have a substantially rectangular shape and are arranged in a matrix.

The display region E is a region substantially contributing to display in the liquid crystal apparatus 1. The light shielding layers 22 and 26 provided in the element substrate 10 are provided in, for example, a lattice shape so as to partition aperture regions of the plurality of pixels P in a planar manner in the display region E. Note that the liquid crystal apparatus 1 may include a dummy region that is provided so as to surround a periphery of the display region E and that does not substantially contribute to display.

A data line drive circuit 51 and a plurality of external connection terminals 54 are provided along a first side of the element substrate 10 opposite to the display region E of the seal material 42. In addition, an inspection circuit 53 is provided on the display region E side of the seal material 42 along a second side facing the first side. Furthermore, a scanning line drive circuit 52 is provided inside the seal material 42 along two other sides that are orthogonal to the first side and the second side and face each other.

A plurality of lines of wiring 55 configured to couple the two scanning line drive circuits 52 are provided on the display region E side of the seal material 42 on the second side on which the inspection circuit 53 is provided. The plurality of lines of wirings coupled to the data line drive circuit 51 and the scanning line drive circuits 52 are coupled to the plurality of external connection terminals 54. Further, each of corner portions of the counter substrate 30 is provided with a vertical conductive portion 56 configured to establish electrical conduction between the element substrate 10 and the counter substrate 30. Note that the arrangement of the inspection circuit 53 is not limited to this arrangement, and may be provided in a position along the inner side of the seal material 42 between the data line drive circuit 51 and the display region E.

In the following description, it is assumed that a direction along the first side on which the data line drive circuit 51 is provided is referred to as an X axis, and a direction along the two other sides that are orthogonal to the first side and face each other is referred to as a Y axis. The X axis is a direction along the line A-A' in FIG. 1. The light shielding layers 22 and 26 are provided in a lattice shape along the X axis and the Y axis. The aperture regions of the pixels P are partitioned in a lattice shape by the light shielding layers 22 and 26, and are arranged in a matrix along the X axis and the Y axis.

It is also assumed that a direction orthogonal to the X axis and the Y axis and directed toward the front in FIG. 1 is a Z axis. Note that, in the present specification, a view from a normal direction (Z axis) of a surface on the counter substrate 30 side in the liquid crystal apparatus 1 is referred to as a "plan view".

As illustrated in FIG. 2, in the display region E of the element substrate 10, a scanning line 2 and a data line 3 are formed so as to intersect each other, and the pixel P is provided so as to correspond to an intersection of the scanning line 2 and the data line 3. A pixel electrode 28 and a TFT 24 as a switching element are provided in each of the pixels P.

A source electrode of the TFT 24 is electrically coupled to the data line 3 extending from the data line drive circuit 51. Image signals, namely, data signals S1, S2, . . . , and Sn are line-sequentially supplied from the data line drive circuit 51 to the data lines 3. A gate electrode of the TFT 24 is a part of the scanning line 2 extending from the scanning line drive circuit 52. Scanning signals G1, G2, . . . , and Gn are line-sequentially supplied from the scanning line drive circuit 52 to the scanning lines 2. A drain electrode of the TFT 24 is electrically coupled to the pixel electrode 28.

The image signals S1, S2, . . . , and Sn are each written to the pixel electrode 28 via the data line 3 at a predetermined timing by setting the TFT 24 in an on state for a certain period. The image signals at a predetermined level written in the liquid crystal layer 40 via the pixel electrodes 28 in such a manner are held for a certain period in a liquid crystal capacitor formed between a common electrode 44 provided in the counter substrate 30 and illustrated in FIG. 3 and the liquid crystal layer 40.

Note that, to prevent the held image signals S1, S2, . . . , and Sn from leaking, a storage capacitor 5 is formed between a capacitance line 4 formed along the scanning line 2 and the pixel electrode 28, and is disposed in parallel with the liquid crystal capacitor. In this way, when a voltage signal is applied to the liquid crystal of each of the pixels P, an alignment state of the liquid crystal changes due to a level of the applied voltage. As the result, light incident on the liquid crystal layer 40 illustrated in FIG. 3 is modulated to enable gradation display.

The liquid crystal constituting the liquid crystal layer 40 has alignment and order of molecular assembly being changed by a level of voltage to be applied, and thus modulates light and enables gradation display. For example, in a case of a normally white mode, a transmittance for incident light decreases in accordance with a voltage applied in each pixel P. In a case of a normally black mode, a transmittance for incident light increases in accordance with a voltage applied in each pixel P. Further, light having a contrast in accordance with the image signal is emitted from the liquid crystal apparatus 1 as a whole.

As illustrated in FIG. 3, the liquid crystal apparatus 1 includes the element substrate 10, the counter substrate 30, and the liquid crystal layer 40 sandwiched between the element substrate 10 and the counter substrate 30. In the liquid crystal apparatus 1, light is incident from the counter substrate 30 side, is transmitted through the liquid crystal layer 40, and is emitted from the element substrate 10 side.

The counter substrate 30 includes a first base material 31, a lens layer 33, the light shielding layer 38, an intermediate layer 34, the light shielding layer 39, a lens layer 35, a light-transmissive layer 37, a protective layer 43, the common electrode 44, and an alignment film 45. The lens layer 33 includes a first microlens ML1. The lens layer 35 includes a third microlens ML3. Therefore, the counter substrate 30 includes microlenses in two stages including the first microlens ML1 and the third microlens ML3.

The first base material 31 is formed of an inorganic material having optical transparency such as glass and quartz, for example. One surface of the first base material 31 on the liquid crystal layer 40 side is assumed to be a surface 31a. The first base material 31 includes a plurality of concave portions 32 formed in the surface 31a. Each of the concave portions 32 is provided for each of the pixels P. A cross-sectional shape of the concave portion 32 is a curved surface such as a semicircle or a semi-ellipse, for example. The concave portion 32 constitutes a lens surface of the first microlens ML1.

The lens layer 33 is formed to be thicker than a depth of the concave portion 32 so as to fill the concave portion 32 and cover the surface 31a of the first base material 31. The lens layer 33 is formed of a material having optical transparency and having a refractive index different from that of the first base material 31. In the present exemplary embodiment, the lens layer 33 is formed of an inorganic material having a refractive index greater than that of the first base material 31. Examples of such an inorganic material include SiON and the like.

The first microlens ML1 is constituted by filling the concave portion 32 with a material forming the lens layer 33. In other words, a convex portion of the lens layer 33 that is acquired by filling the concave portion 32 and protrudes toward the first base material 31 side, which is the side on which light is incident, is the first microlens ML1. Each first microlens ML1 is disposed for each of the pixels P. A surface of the lens layer 33 is a flat surface that is substantially parallel to the surface 31a of the first base material 31. Note that incident light incident on the first microlens ML1 is condensed at the center of the first microlens ML1, that is, toward a focal point of the curved surface.

The light shielding layer 38 is provided on the liquid crystal layer 40 side of the lens layer 33. The light shielding layer 38 is provided so as to surround the periphery of the display region E illustrated in FIG. 1 in which the first microlens ML1 and the third microlens ML3 are disposed. The light shielding layer 38 is made of, for example, a metal, a metal compound, and the like. The light shielding layer 38 may be provided in the display region E so as to overlap the light shielding layer 22 and the light shielding layer 26 of the element substrate 10 in plan view. In this case, the light shielding layer 38 may be formed in a lattice shape, an island shape, a stripe shape, or the like, but the light shielding layer 38 may be disposed in a range narrower than that of the light shielding layer 22 and the light shielding layer 26 in plan view.

The intermediate layer 34 is formed so as to cover the lens layer 33 and the light shielding layer 38. The intermediate layer 34 is formed of an inorganic material having optical transparency and having, for example, approximately the same refractive index as that of the lens layer 35. Examples of such an inorganic material include SiON and the like. The intermediate layer 34 has a function of matching a distance from the first microlens ML1 to the third microlens ML3 to a desired value. A layer thickness of the intermediate layer 34 is appropriately set based on an optical condition such as a focal length of the microlens ML1 in accordance with a wavelength of light.

The light shielding layer 39 is provided on the intermediate layer 34 so as to overlap the light shielding layer 38 in plan view. The light shielding layer 39 is formed of the same material as that of the light shielding layer 38.

The lens layer 35 is formed on the intermediate layer 34 and the light shielding layer 39. The lens layer 35 is formed of a material similar to that of the lens layer 33, for example. Further, a refractive index of the lens layer 35 may be greater than a refractive index of the lens layer 33.

The lens layer 35 includes a plurality of convex portions 36 that protrude toward the liquid crystal layer 40 side, that is, toward the side opposite to the first microlens ML1. The convex portion 36 constitutes a lens surface of the third microlens ML3. In other words, the convex portion 36 of the lens layer 35 is the third microlens ML3. Each of the convex portions 36 is provided for each of the pixels P and is disposed so as to overlap each of the concave portions 32 in plan view. Therefore, the third microlens ML3 is disposed so as to overlap the first microlens ML1 in plan view. A cross-sectional shape of the convex portion 36 is a curved surface such as a semicircle or a semi-ellipse.

The light-transmissive layer 37 is formed to be thicker than a height of the convex portion 36 so as to fill between the convex portions 36 and around the convex portion 36 and cover the lens layer 35. The light-transmissive layer 37 is formed of an inorganic material having optical transparency and having, for example, a refractive index smaller than that of the lens layer 35. Examples of such an inorganic material include $SiO_2$ and the like. The convex-shaped third microlens ML3 protruding toward the liquid crystal layer 40 side is constituted by covering the convex portion 36 with the light-transmitting layer 37. Each third microlens ML3 is disposed for each of the pixels P.

The light-transmissive layer 37 has functions of flattening irregularities of a surface of the lens layer 35 and also matching a distance from the third microlens ML3 to the light shielding layer 26 to a desired value. A layer thickness of the light-transmissive layer 37 is appropriately set based on an optical condition such as a focal length of the third microlens ML3 in accordance with a wavelength of light.

The protective layer 43 is provided so as to cover the light-transmissive layer 37. The common electrode 44 is provided so as to cover the protective layer 43. The common electrode 44 is formed across the plurality of pixels P. The common electrode 44 is formed of a transparent conductive film such as Indium Tin Oxide (ITO) and Indium Zinc Oxide (IZO), for example. The alignment film 45 is provided so as to cover the common electrode 44.

The element substrate 10 includes a second base material 11, a lens layer 14, a light-transmissive layer 21, the light shielding layer 22, an insulating layer 23, the TFT 24, an insulating layer 25, the light shielding layer 26, an insulating layer 27, the pixel electrode 28, and an alignment film 29. The lens layer 14 includes a second microlens ML2. In other words, the element substrate 10 includes the second microlens ML2. Therefore, the liquid crystal apparatus 1 in the present exemplary embodiment includes microlenses in three stages including the first microlens ML1, the second microlens ML2, and the third microlens ML3.

The element substrate 10 includes a first region 10a and a second region 10b, for example, as an X-Y planar region. The first region 10a is a region including the display region E illustrated in FIG. 1 in which the pixels P are disposed. The second region 10b is a region outside the first region 10a.

The second base material 11 is formed of a material having optical transparency such as glass and quartz, for example. One surface of the second base material 11 on the liquid crystal layer 40 side is assumed to be a surface 11a. The second base material 11 includes a concave portion 12 formed in the first region 10a of the surface 11a. A plurality of concave portions 13 are provided in a bottom portion 12a of the concave portion 12. Each of the concave portions 13 is provided for each of the pixels P. A cross-sectional shape of the concave portion 13 is a curved surface, such as a semicircle or a semi-ellipse, for example, with a flat portion 50 at the center. The concave portion 13 constitutes a lens surface of the second microlens ML2.

The lens layer 14 is formed in the first region 10a on the second base material 11 so as to fill the concave portion 12 and the concave portion 13. The lens layer 14 is formed of an inorganic material having optical transparency and having a refractive index different from that of the second base material 11. In the present exemplary embodiment, a refractive index of the lens layer 14 is greater than a refractive index of the second base material 11, and is smaller than a refractive index of the lens layer 33 and the lens layer 35. Examples of such an inorganic material include SiON and the like.

The second microlens ML2 is constituted by filling the concave portion 13 with a material forming the lens layer 14. In other words, a convex portion of the lens layer 14 that is acquired by filling the concave portion 13 and protrudes toward the second base material 11 side, which is the side on which light is emitted, is the second microlens ML2. Each second microlens ML2 is disposed for each of the pixels P. The second microlens ML2 is disposed so as to overlap the first microlens ML1 and the third microlens ML3 in plan view.

A surface 14a of the lens layer 14 constitutes a flat surface that is continuous with the surface 11a of the second base material 11 in the second region 10b. In other words, the lens layer 14 is disposed in the first region 10a and is not disposed in the second region 10b.

The light-transmissive layer 21 is formed so as to cover the surface 11a of the second base material 11 and the surface 14a of the lens layer 14. The light-transmissive layer 21 is formed of an inorganic material, such as $SiO_2$, for example, that has optical transparency and has, for example, approximately the same refractive index as that of the second base material 11. The light-transmitting layer 21 has functions of protecting the lens layer 14 and also matching a distance from the second microlens ML2 to the third microlens ML3 to a desired value. A layer thickness of the light-transmissive layer 21 is appropriately set based on an optical condition such as a focal length of the second microlens ML2 in accordance with a wavelength of light.

The light shielding layer 22 is provided on the light-transmissive layer 21. The light shielding layer 22 is formed in a lattice shape so as to overlap the light shielding layer 26 at an upper layer in plan view. The light shielding layer 22 and the light shielding layer 26 are made of, for example, a metal, a metal compound, and the like. The light shielding layer 22 and the light shielding layer 26 are disposed so as to sandwich the TFT 24 therebetween in a thickness direction (Z axis) of the element substrate 10. The light shielding layer 22 overlaps at least a channel region of the TFT 24 in plan view.

Incidence of light on the TFT 24 from the second base material 11 side is suppressed by the light shielding layer 22, and incidence of light on the TFT 24 from the liquid crystal layer 40 side is suppressed by the light shielding layer 26. Thus, an increase in optical leakage current at the TFT 24 and a malfunction caused by light can be suppressed. The light shielding layer 22 and the light shielding layer 26 constitute a light shielding region S. A region within an opening 22a surrounded by the light shielding layer 22 and a region within an opening 26a surrounded by the light shielding layer 26 overlap each other in plan view, and are an opening region T of the region of the pixel P through which light is transmitted.

The insulating layer 23 is provided so as to cover the light-transmissive layer 21 and the light shielding layer 22. The insulating layer 23 is formed of an inorganic material such as $SiO_2$, for example.

The TFT 24 is provided on the insulating layer 23 and is disposed in a region overlapping the light shielding layer 22 and the light shielding layer 26 in plan view. The TFT 24 is a switching element that drives the pixel electrode 28. The TFT 24 includes a semiconductor layer (not illustrated), a gate electrode, a source electrode, and a drain electrode. A source region, a channel region, and a drain region are formed in the semiconductor layer. A Lightly Doped Drain (LDD) region may be formed in the channel region and source region, or at an interface between the channel region and the drain region.

The gate electrode is formed in a region overlapping the channel region of the semiconductor layer in plan view in the element substrate 10 via a part of the insulating layer 25, namely, a gate insulating film. Although not illustrated, the gate electrode is electrically coupled to a scanning line disposed on the lower layer side via a contact hole, and controls the TFT 24 to turn on and off by being applied with a scanning signal.

The insulating layer 25 is provided so as to cover the insulating layers 23 and the TFT 24. The insulating layer 25 is formed of an inorganic material such as $SiO_2$, for example. The insulating layer 25 includes a gate insulating film that insulates between the semiconductor layer and the gate electrode of the TFT 24. The insulating layer 25 reduces irregularities of a surface caused by the TFT 24. The light shielding layer 26 similar to the light shielding layer 22 is provided on the insulating layer 25. Then, the insulating layer 27 formed of an inorganic material is provided so as to cover the insulating layer 25 and the light shielding layer 26.

The pixel electrode 28 is provided on the insulating layer 27 for each of the pixels P. The pixel electrode 28 is disposed in a region overlapping the opening 22a of the light shielding layer 22 and the opening 26a of the light shielding layer 26 in plan view. The pixel electrode 28 is formed of a transparent conductive film such as Indium Tin Oxide (ITO) and Indium Zinc Oxide (IZO), for example. The alignment film 29 is provided so as to cover the pixel electrode 28. The liquid crystal layer 40 is encapsulated between the alignment film 29 on the element substrate 10 side and the alignment film 45 on the counter substrate 30 side.

Note that, although not illustrated in the drawings, an electrode for supplying an electrical signal to the TFT 24, wiring, a relay electrode, a capacitance electrode constituting the storage capacitor 5 illustrated in FIG. 2, and the like are provided in the region overlapping the light shielding layer 22 and the light shielding layer 26 in plan view.

In the liquid crystal apparatus 1 according to the present exemplary embodiment, light emitted from a light source or the like is incident from the counter substrate 30 side including the first microlens ML1 and the third microlens ML3, and is emitted from the element substrate 10 side including the second microlens ML2.

Note that, a normal direction of the surface of the first base material 31 that constitutes the counter substrate 30 is simply referred to as a "normal direction" hereinafter. The "normal direction" is a direction along the Z axis in FIG. 3, and is substantially the same direction as the normal direction of the second base material 11 that constitutes the element substrate 10.

Of light incident on the liquid crystal apparatus 1, light L1 incident on the center of the first microlens ML1 in the first stage along the normal direction travels straight, is incident on the center of the third microlens ML3 in the second stage, travels straight without any change, and is transmitted through the liquid crystal layer 40. The light L1 is transmitted through the opening region T of the pixel P, is incident on the center of the second microlens ML2 in the third stage, travels straight through the flat portion 50, and is emitted from the element substrate 10 side.

In a case where light L2 incident along the normal direction near an end portion of the first microlens ML1 travels straight without any change, the light L2 is shielded by the light shielding layer 26 as indicated by the dashed line. However, the light L2 is refracted toward the center side of the first microlens ML1 due to refractive power of the first microlens ML1, namely, a difference in refractive index between the first base material 31 and the lens layer 33, and is incident on the third microlens ML3. Then, the light L2 incident on the third microlens ML3 is further refracted toward the center side of the third microlens ML3 due to refractive power of the third microlens ML3, namely, a difference in refractive index between the lens layer 35 and the light-transmitting layer 37, travels obliquely with respect to the normal direction, and is transmitted through the opening region T.

In a case where the light L2 refracted by the third microlens ML3 and incident on the second microlens ML2 obliquely with respect to the normal direction travels straight without any change, the light L2 is directed outward with respect to the center of the second microlens ML2 as indicated by the dashed line, and becomes light that spreads to the outside of the region of the pixel P. However, due to refractive power of the second microlens ML2 (a difference in refractive index between the second base material 11 and the lens layer 14), the light L2 incident on the second microlens ML2 is bent back toward the center side of the second microlens ML2 and emitted from the element substrate 10 side.

Among the light incident on the liquid crystal apparatus 1, there is also light that is incident obliquely with respect to the normal direction, such as light L3. In a case where the light L3 incident obliquely with respect to the normal direction near the end portion of the first microlens ML1 and outward with respect to the center of the first microlens ML1 travels straight without any change, the light L3 is directed toward the adjacent pixel P side as indicated by the dashed line. However, the light L3 is refracted toward the center side of the first microlens ML1 due to the refractive power of the first microlens ML1, and is incident on the third microlens ML3.

In a case where the light L3 incident on the third microlens ML3 travels straight without any change, the light L3 is shielded by the light shielding layer 26 as indicated by the dashed line. However, due to the refractive power of the third microlens ML3, the light L3 is refracted toward the center side of the third microlens ML3, is transmitted through the opening region T, and is incident on the second microlens ML2. When the light L3 incident on the second microlens ML2 is incident on the flat portion 50 in the center of the lens, the light L3 is bent back into a central direction in the opening region T and emitted from the element substrate 10 side.

In a case where the second microlens ML2 does not include the flat portion 50 and is hemispherical, it is conceivable that light is bent excessively by the second microlens ML2, which may increase oblique light. Thus, when the spread of the light emitted from the liquid crystal apparatus 1 is great, the light applied to a region other than the effective projection region of the projection lens of the projector is increased, which leads to a reduction in the light utilization efficiency and the contrast ratio in the projector.

However, in the present exemplary embodiment, by including the flat portion 50 at the center of the second microlens ML2, the second microlens ML2 has a function of bending back light directed toward the outside of the region of the pixel P. As the result, the spread of the light is suppressed by the second microlens ML2 and the light is emitted from the element substrate 10 side, and thus the light utilization efficiency and the contrast ratio in the projector can be improved.

Configuration of Second Microlens

Figure 4:
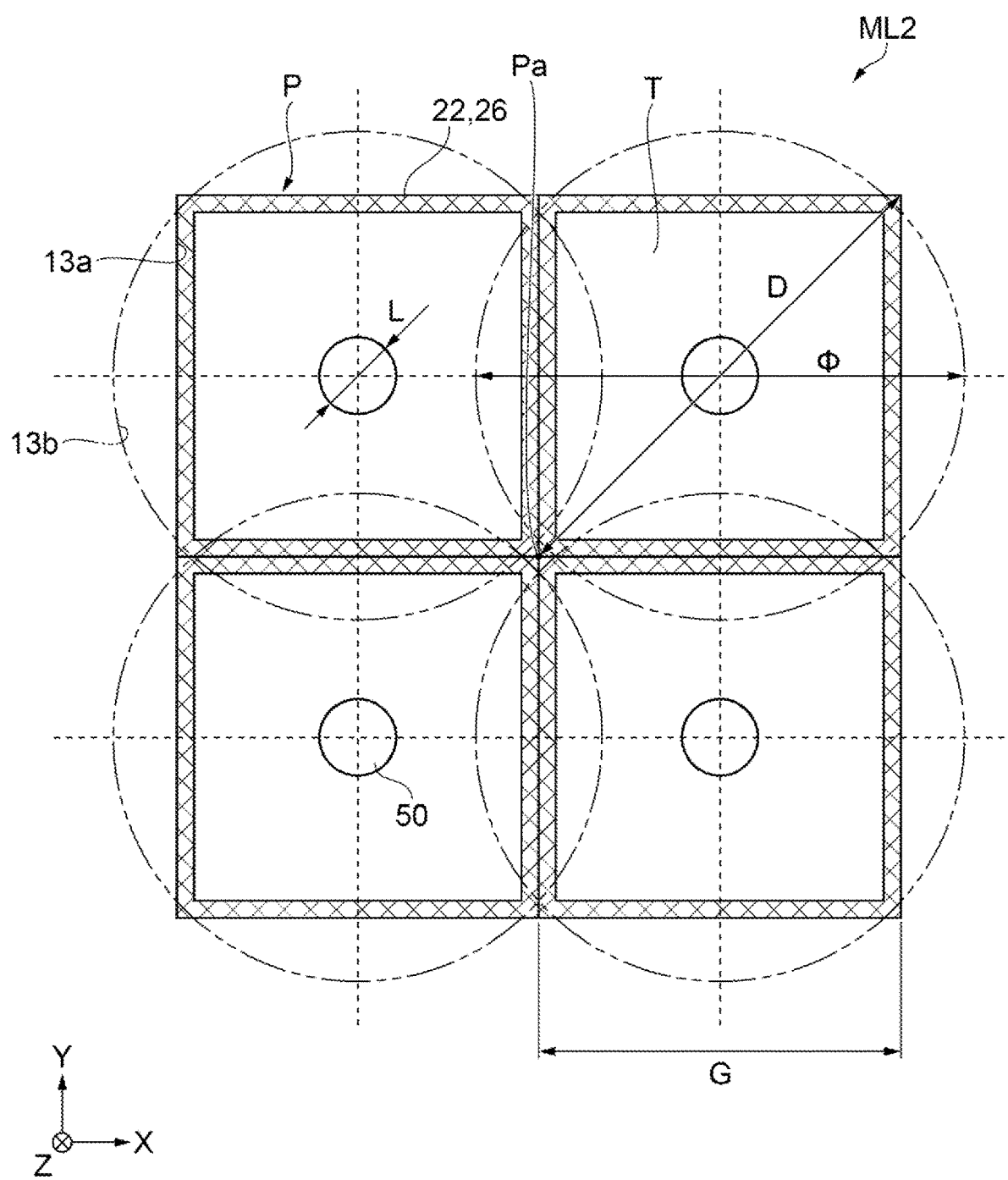
FIG. 4 is a schematic plan view of a second microlens.
Figure 5:
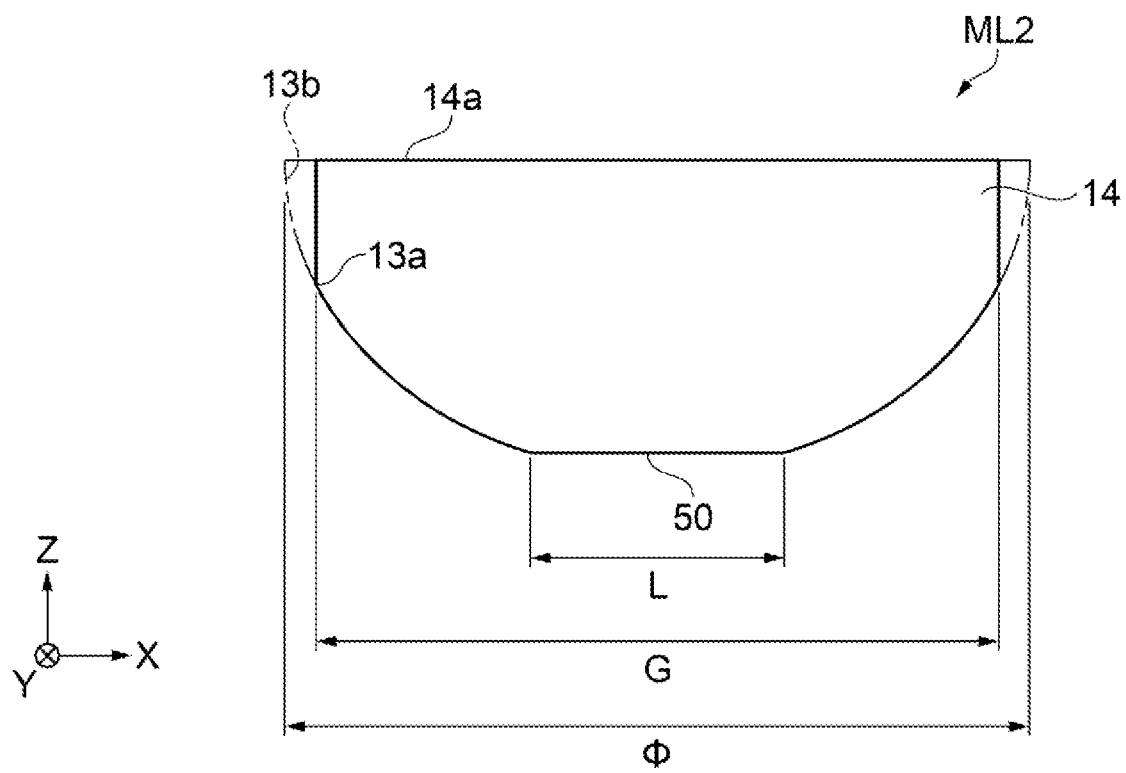
FIG. 5 is a schematic cross-sectional view of the second microlens illustrated in FIG. 4.

Next, a configuration of the second microlens ML2 will be described with reference to FIGS. 4 and 5. FIG. 4 is a schematic plan view of a second microlens. FIG. 5 is a schematic cross-sectional view of the second microlens illustrated in FIG. 4. Note that FIG. 5 illustrates an X-Z cross section of the second microlens ML2, but a Y-Z cross section of the second microlens ML2 is also a similar cross section.

FIG. 4 illustrates four pixels P. As illustrated in FIG. 4, the pixel P has a substantially rectangular planar shape. The plurality of pixels P having such a shape are arranged such that the pixels P adjacent to each other in the X axis and the Y axis come into contact with each other. The light shielding layer 22 is disposed on a peripheral edge portion of the pixel P. The light shielding layer 22 is disposed along a boundary between the pixels P adjacent to each other in the X axis and the Y axis. In the pixel P, the inside of the light shielding region S is the opening region T through which light is transmitted.

A length of a diagonal line of the pixel P is assumed to be D, and a length of one side of the X axis of the pixel P is assumed to be G. An arrangement pitch of the pixel P in the X axis is G. Assuming that a planar shape of the pixel P is square, an arrangement pitch of one side of the Y axis of the pixel P is also G, and the length D of the diagonal line of the pixel P is $\sqrt{2}$ times the arrangement pitch G.

The concave portion 13 constituting the lens shape of the second microlens ML2 included in the element substrate 10 has a substantially circular planar shape that is virtually indicated by a two-dot chain line. The virtual outer shape of the concave portion 13 of the second microlens ML2 is larger than an inscribed circle of the pixel P. That is, a lens diameter of the second microlens ML2, namely, a diameter $\Phi$ of the concave portion 13 is greater than the arrangement pitch G of the pixel P. In other words, the lens diameter $\Phi$ of the second microlens ML2 is, for example, the arrangement pitch $G \times \sqrt{2} \times 95\%$ of the pixel P. Further, a length 13a in the X-axis direction of the second microlens ML2 is the same as the arrangement pitch G of the pixel.

An outer peripheral end portion 13b of the second microlens ML2, namely, the concave portion 13 is disposed within the pixel P in a direction of the diagonal line of the pixel P, but is not disposed within the pixel P in the X axis and the Y axis. That is, the second microlenses ML2, namely, the concave portions 13 adjacent to each other in the direction of the diagonal line of the pixel P are separated from each other, but the second microlenses ML2, namely, the concave portions 13 adjacent to each other in the X axis and the Y axis are coupled to each other. In other words, at least a part of the second microlens ML2 is in contact with the adjacent second microlens ML2.

Since the second microlenses ML2 adjacent to each other in the direction of the diagonal line of the pixel P are separated from each other, there is a region Pa that does not overlap the second microlens ML2 in plan view at the four corners of the pixel P. The lens layer 14 is disposed in the region Pa, but the concave portion 13 that serves as the lens surface is not disposed therein.

The second microlens ML2 includes the flat portion 50 at the center of the lens. The size of the flat portion 50 is, for example, less than or equal to 70% of the length of the diagonal line of the pixel P, and a maximum length of the flat portion is greater than or equal to 1 μm. As illustrated in FIG. 4, a shape of the flat portion 50 is, for example, a round shape that is greater than or equal to Φ1 μm. Note that a shape of the flat portion 50 is not limited to a round shape, and may be polygonal, and is a shape having a flat area L that is greater than or equal to a certain degree.

By including the flat portion 50 as described above, excessive bending of light is suppressed, and thus parallel light transmitted through the second microlens can be increased. Specifically, when the entire second microlens has a curved shape, even in a case where parallel light is incident on the center of the second microlens, the light is refracted and emitted, and oblique light incident on the projection lens is increased.

However, in the present exemplary embodiment, by including the flat portion 50 at the center of the second microlens, parallel light incident on the center of the second microlens is transmitted without any change, and thus oblique light incident on the projection lens can be suppressed. As the result, the amount of vignetting of the projection lens of light transmitted through the element substrate can be suppressed.

Furthermore, as compared to a case where the second microlens ML2 has a curved shape, it is possible to reduce, for example, primary diffracted light or secondary diffracted light produced by diffraction, and it is possible to increase zero-order light, which is light that does not diffract. As the result, of the light transmitted through the element substrate 10, the intensity of the non-refracted zero-order light passing through the flat portion 50 can be increased, and variation in angle of the light incident on the projection lens can be reduced, and thus the contrast ratio can be improved.

In this way, according to the liquid crystal apparatus in the present exemplary embodiment, both of improved light utilization efficiency and an improved contrast ratio can be achieved. Further, when the liquid crystal apparatus 1 is used as a liquid crystal light valve of a projector, vignetting of light incident on a projection lens can be suppressed by suppressing oblique light, and thus the light utilization efficiency and the contrast ratio of the projector can be improved.

The incident parallel light is not refracted and is transmitted through the flat portion 50 without any change, and thus a region of the flat portion 50 may be increased as large as possible. However, in a case where the diameter Φ of the second microlens ML2 is set to be less than or equal to 95% of the length D of the diagonal line as described above, a region of the curved surface portion of the second microlens ML2 becomes relatively small when the region of the flat portion 50 is too large. As the result, light incident on the peripheral edge portion of the second microlens ML2 and refracted toward the center side of the opening region T is reduced.

Thus, by setting a distance of the flat portion 50 to be less than or equal to 70% of the length D of the diagonal line of the pixel P and setting a maximum length of the flat portion to be greater than or equal to 1 μm, a region in which light at the peripheral edge portion is refracted can be secured while increasing a region through which parallel light is transmitted without any change.

Further, as illustrated in FIG. 5, a cross-sectional shape of the second microlens ML2 is a substantially trapezoidal shape formed with round corners while a part of the cross-sectional shape of the second microlens ML2 has a curved surface such as a semicircle or a semi-ellipse. Note that light passing through a curved lens that does not include the flat portion 50 at the center of the second microlens ML2 is refracted by a curved surface and emitted as oblique light.

However, as in the present exemplary embodiment, since the flat portion 50 is provided at the center of the second microlens ML2, oblique light generated by refraction and oblique light generated by diffraction are reduced, and the light utilization efficiency can be improved. In other words, only the necessary light can be bent and emitted. Furthermore, parallel light incident on the flat portion 50 can be transmitted without any change, that is, a ratio of the zero-order light can be increased, and variation in angle of the light can also be suppressed. Thus, the contrast ratio of the liquid crystal apparatus 1 can be improved.

In this way, by including the flat portion 50 at the center of the second microlens ML2, excessive bending of light can be suppressed. Thus, a ratio of zero-order light of a diffraction component is increased by reducing diffracted light. As the result, the contrast ratio can be improved. Additionally, the contrast ratio can be improved by reducing the power of the second microlens ML2 disposed on the element substrate 10 side as compared to that of the first microlens ML1 and the third microlens ML3 disposed on the counter substrate 30 side.

Electronic Apparatus

Figure 6:
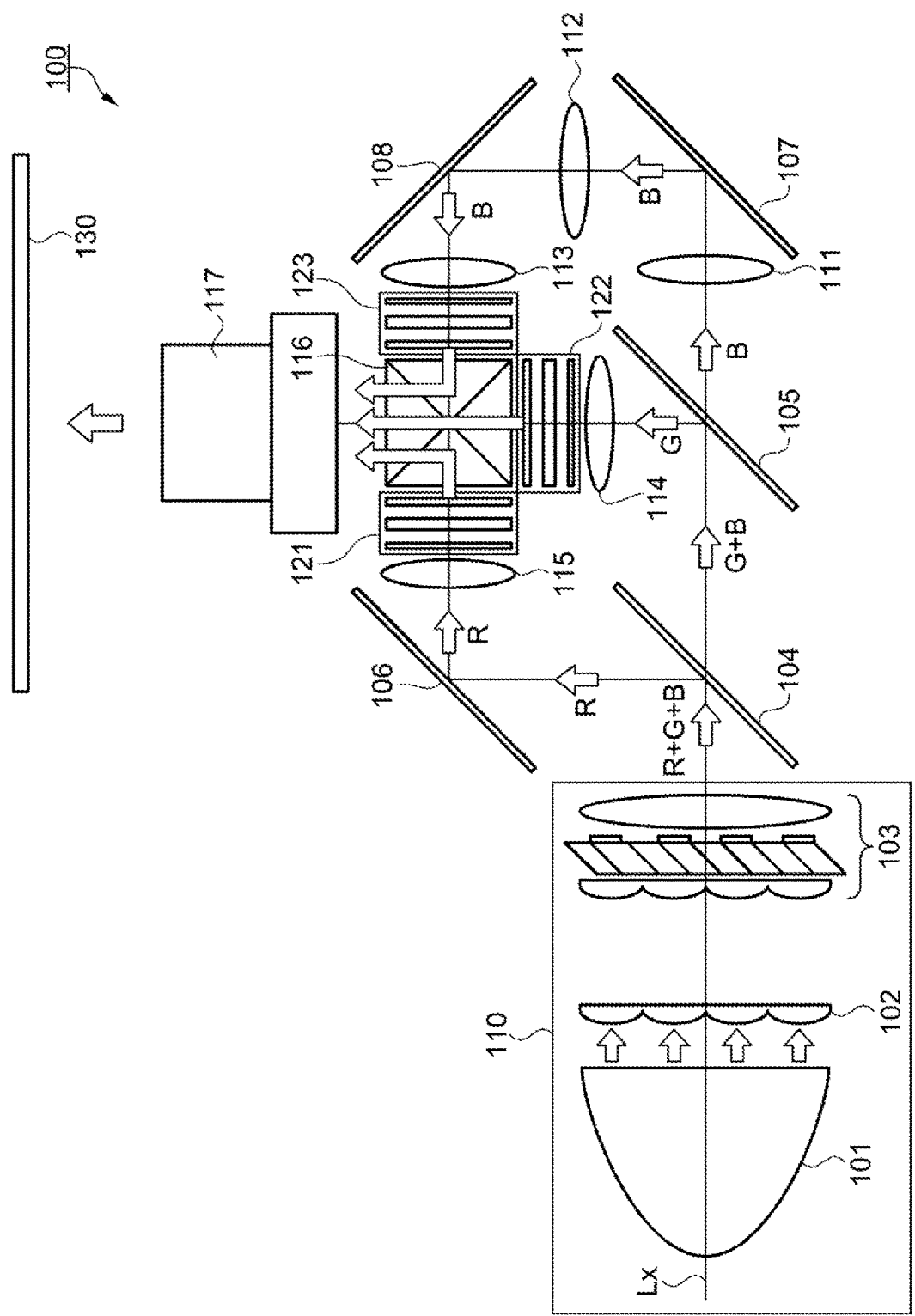
FIG. 6 is a schematic view illustrating a configuration of a projector.

Next, a configuration of a projector as an electronic apparatus according to the present exemplary embodiment will be described. FIG. 6 is a schematic view illustrating the configuration of the projector. Hereinafter, the configuration of the projector will be described with reference to FIG. 6.

As illustrated in FIG. 6, the projector 100 includes a polarized light illumination device 110, two dichroic mirrors 104 and 105, three reflection mirrors 106, 107, and 108, and five relay lenses 111, 112, 113, 114, and 115, three liquid crystal light valves 121, 122, and 123, a cross dichroic prism 116, and a projection lens 117.

The polarized light illumination device 110 includes a lamp unit 101 as a light source including a white light source such as an extra-high pressure mercury lamp or a halogen lamp, an integrator lens 102, and a polarization conversion element 103. The lamp unit 101, the integrator lens 102, and the polarization conversion element 103 are arranged along a system optical axis Lx.

The dichroic mirror 104 reflects red light and transmits green light and blue light, of a polarized light flux emitted from the polarized light illumination device 110. The other dichroic mirror 105 reflects the green light transmitted through the dichroic mirror 104 and transmits the blue light.

The red light reflected by the dichroic mirror 104 is reflected by the reflection mirror 106 and is then incident on the liquid crystal light valve 121 via the relay lens 115. The green light reflected by the dichroic mirror 105 is incident on the liquid crystal light valve 122 via the relay lens 114. The blue light transmitted through the dichroic mirror 105 is incident on the liquid crystal light valve 123 via a light guide system including the three relay lenses 111, 112, and 113 and the two reflection mirrors 107 and 108.

The transmissive liquid crystal light valves 121, 122, and 123 as light modulation elements are each disposed to face an incident surface of each type of color light of the cross dichroic prism 116. The color light incident on the liquid crystal light valves 121, 122, and 123 is modulated based on video information (video signal) and emitted toward the cross dichroic prism 116.

In the cross dichroic prism 116, four right-angle prisms configured to be bonded together, and on inner surfaces of the prisms, a dielectric multilayer film configured to reflect the red light and a dielectric multilayer film configured to reflect the blue light are formed in a cross shape. The three types of color light are synthesized by these dielectric multilayer films, and light representing a color image is synthesized. The synthesized light is projected onto a screen 130 by the projection lens 117 being the projection optical system, and an image is enlarged and displayed.

A pair of light-polarizing elements disposed in a crossed-Nicols state on the incident side and the emission side of the color light of the liquid crystal light valve 121 are disposed with a gap interposed between the pair of light-polarization elements. The same applies to the other liquid crystal light valves 122 and 123. The liquid crystal light valves 121, 122, and 123 are liquid crystal light valves to which the liquid crystal apparatus 1 of the present exemplary embodiment described above is applied.

According to the configuration of the projector 100 according to the present exemplary embodiment, even in a case where the plurality of pixels P are disposed with high definition, the liquid crystal apparatus 1 in which the utilization efficiency of incident light from the light source is high and the spread of emitted light is suppressed is included in the liquid crystal light valves 121, 122, and 123, and thus the projector 100 having bright display and a high contrast can be provided.

As described above, according to the liquid crystal apparatus 1 and the projector 100 in the present exemplary embodiment, the following advantages are obtained.

(1) According to the present exemplary embodiment, the liquid crystal apparatus 1 includes the flat portion 50 at the center of the second microlens ML2. Thus, excessive bending of light passing through the first microlens ML1 and the third microlens ML3 can be suppressed, and vignetting of the light due to the projection lens can be reduced. Thus, the light utilization efficiency can be improved. Further, diffraction light can be reduced, and thus a contrast can be improved.

(2) According to the present exemplary embodiment, the projector 100 capable of improving display quality such as a contrast can be provided.

Modification Examples

Further, the embodiments described above may be modified as follows.

In the exemplary embodiment described above, the first microlens ML1 and the third microlens ML3 are provided on the counter substrate 30 side, and the second microlens ML2 is provided on the element substrate 10 side, but the present disclosure is not limited to this exemplary embodiment. One microlens may be provided on the counter substrate 30 side, and one microlens may also be provided on the element substrate 10 side.

In the exemplary embodiment described above, a planar shape of the second microlens ML2 is a virtual circular shape, but the present disclosure is not limited thereto. The planar shape of the second microlens ML2 may be, for example, a substantially rectangular shape with four round corners corresponding to the pixel P.

In the exemplary embodiment described above, the center of the microlens and the center of the pixel are the same, but the present disclosure is not limited thereto. The center of the microlens may be disposed in a position different from that of the center of the pixel, or the center position of the second microlens ML2 may be disposed so as to shift gradually from the center of the display region E toward the outside of the display region E. Further, the amount of displacement varying with each RGB may be changed.

Contents derived from the exemplary embodiments will be described below.

A liquid crystal apparatus includes a first substrate, a second substrate disposed to face the first substrate via a liquid crystal layer, and a display region in which a pixel is disposed, light being incident on the liquid crystal layer from the first substrate. The first substrate includes a first microlens disposed to correspond to the pixel. The second substrate includes a switching element and a second microlens that are disposed to correspond to the pixel. The second microlens includes a flat portion at the center.

According to this configuration, the liquid crystal apparatus includes the flat portion at the center of the second microlens. Thus, excessive bending of light passing through the first microlens can be suppressed, and vignetting of light in the projection lens can be reduced. Thus, the light utilization efficiency can be improved. Further, diffraction light can be reduced, and thus a contrast can be improved.

In the liquid crystal apparatus described above, a maximum length of the flat portion in plan view may be greater than or equal to 1 μm.

According to this configuration, the flat portion has the length as described above. Thus, excessive bending of light passing through the first microlens can be suppressed, and vignetting of light in the projection lens can be reduced.

In the liquid crystal apparatus described above, a maximum length of the flat portion in plan view may be less than or equal to 70% of a length of a diagonal line of the pixel.

According to this configuration, the flat portion has the length as described above. Thus, excessive bending of light passing through the first microlens can be suppressed, and vignetting of light in the projection lens can be reduced.

In the liquid crystal apparatus described above, the first substrate may include a third microlens disposed to correspond to the first microlens.

According to this configuration, the first microlens and the third microlens are provided on the first substrate, that is, double lenses facing each other are provided, and thus incident light can be made to be substantially parallel light.

An electronic apparatus includes the liquid crystal apparatus described above.

According to this configuration, an electronic apparatus capable of improving display quality such as a contrast can be provided.

What is claimed is:

1. A liquid crystal apparatus, comprising:
a first substrate;
a second substrate disposed to face the first substrate via a liquid crystal layer; and
a pixel disposed in a display region, wherein:
the first substrate includes a first microlens provided in the pixel,
the second substrate includes a base material, an insulating layer disposed between the base material and the liquid crystal layer, a switching element disposed on the insulating layer, a first concave portion disposed between the base material and the insulating layer, and a second microlens provided in the pixel,
the second microlens includes a second concave portion that extends from a bottom portion of the first concave portion, and a lens layer disposed in the first concave portion and the second concave portion, and
the second concave portion includes a flat portion at a center.

2. The liquid crystal apparatus according to claim 1, wherein a maximum length of the flat portion in plan view is greater than or equal to 1 μm.

3. The liquid crystal apparatus according to claim 2, wherein a maximum length of the flat portion in plan view is less than or equal to 70% of a length of a diagonal line of the pixel.

4. The liquid crystal apparatus according to claim 1, wherein the first substrate includes a third microlens disposed to correspond to the first microlens.

5. An electronic apparatus comprising the liquid crystal apparatus according to claim 1.

6. The liquid crystal apparatus according to claim 1, wherein
the second substrate includes a first region including the display region in plan view, and a second region outside of the first region, and
the lens layer is disposed in the first region.

7. The liquid crystal apparatus according to claim 6, wherein
the lens layer is not disposed in the second region.

8. A liquid crystal apparatus, comprising:
a first substrate; and
a second substrate disposed to face the first substrate, the second substrate including:
a switching element corresponding to a pixel,
a first concave portion,
a second concave portion provided in a bottom portion of the first concave portion such that the second concave portion is disposed to correspond to the pixel, the second concave portion including a flat portion at a center, and
a microlens including a lens layer that covers the first concave portion and the second concave portion.

9. The liquid crystal apparatus according to claim 8, wherein
the second substrate includes a first region including a display region in plan view, and a second region outside of the first region, and
the lens layer is disposed in the first region.

10. The liquid crystal apparatus according to claim 9, wherein
the lens layer is not disposed in the second region.

11. An electronic apparatus comprising the liquid crystal apparatus according to claim 8.

12. A display apparatus, comprising:
a first substrate; and
a second substrate disposed to face the first substrate, the second substrate including a switching element disposed to corresponding to a display region and a microlens array; wherein
the microlens array includes a concave portion and a lens layer disposed in the concave portion,
an outer edge of the lens layer is disposed in a first region of the second substrate without a second region of the second substrate, the first region includes the display region in plan view, and the second region is outside of the first region, and
the concave portion includes a flat portion at a center.

13. An electronic apparatus comprising the display apparatus according to claim 12.

* * * * *